(No Model.) 2 Sheets—Sheet 1.
A. F. JACKSON.
FIFTH WHEEL ATTACHMENT FOR PLOWS.
No. 550,931. Patented Dec. 3, 1895.
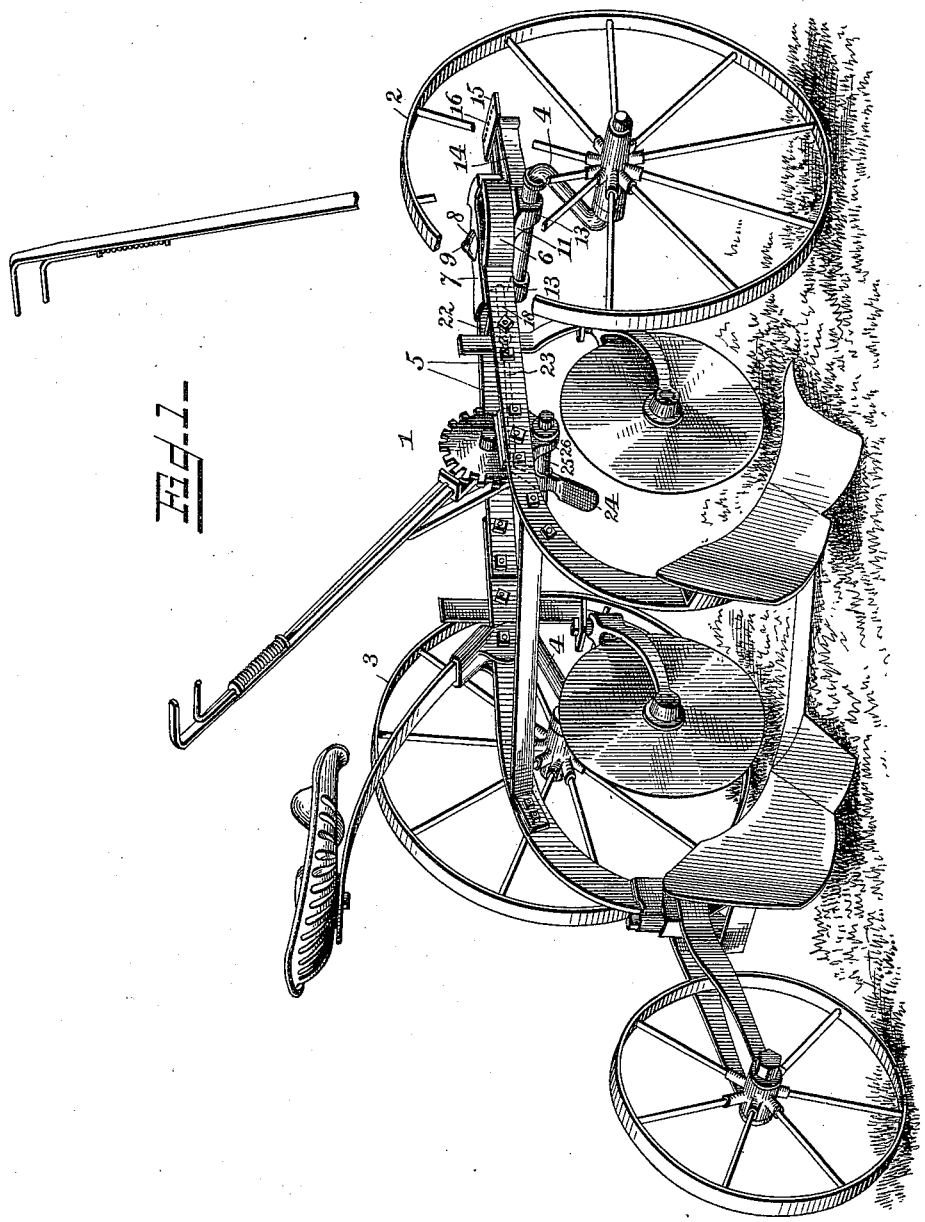
Witnesses
Chas. H. Durand
Inventor
A. F. Jackson
By his Attorneys.
C. A. Snow & Co.

(No Model.) 2 Sheets—Sheet 2.
A. F. JACKSON.
FIFTH WHEEL ATTACHMENT FOR PLOWS.
No. 550,931. Patented Dec. 3, 1895.
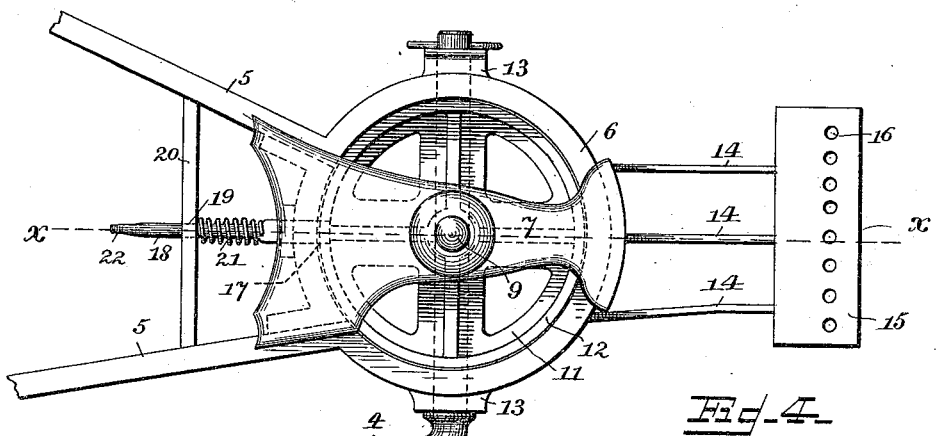
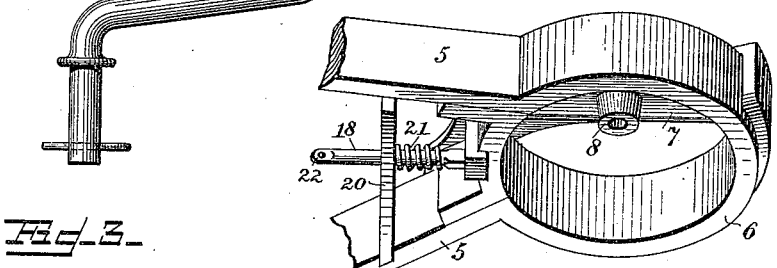
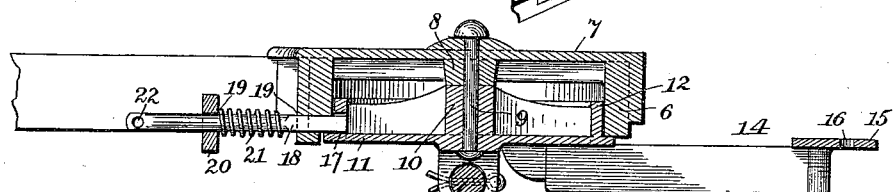
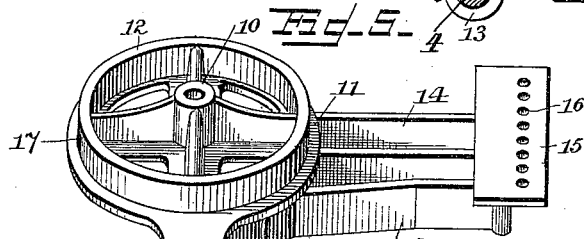
Witnesses
Chas N. Ourand
L. P. Mothaupt
Inventor
A. F. Jackson
By his Attorneys.
C. A. Snow & Co.

UNITED STATES PATENT OFFICE.

AMBROSE F. JACKSON, OF OKLAHOMA, OKLAHOMA TERRITORY, ASSIGNOR TO THE JACKSON PLOW MANUFACTURING COMPANY, OF SAME PLACE.

FIFTH-WHEEL ATTACHMENT FOR PLOWS.

SPECIFICATION forming part of Letters Patent No. 550,931, dated December 3, 1895.

Application filed October 5, 1894. Serial No. 525,024. (No model.)

*To all whom it may concern:*

Be it known that I, AMBROSE F. JACKSON, a citizen of the United States, residing at Oklahoma, in the county of Oklahoma and Territory of Oklahoma, have invented a new and useful Fifth-Wheel Attachment for Plows or Cultivators, of which the following is a specification.

This invention relates to fifth-wheel attachments for plows and cultivators; and it has for its object to provide a new and useful device of this character adapted to be used in connection with either plows or cultivators for the purpose of providing means whereby the forward wheel of the plow or cultivator will swing around or turn at the end of the furrow on the same principle as the front wheels in an ordinary vehicle.

To this end, therefore, the invention contemplates a fifth-wheel or turning attachment for plows or cultivators which will obviate scraping or dragging of the forward wheel, tipping over, and the necessity of a pole or tongue.

With these and other objects in view, which will readily appear as the nature of the invention is better understood, the same consists in the novel construction, combination, and arrangement of parts hereinafter more fully described, illustrated, and claimed.

In the accompanying drawings, Figure 1 is a perspective view of a wheeled gang-plow equipped with the herein-described attachment. Fig. 2 is a detail plan view of the fifth-wheel attachment. Fig. 3 is a longitudinal sectional view on the line $x$ $x$ of Fig. 2. Fig. 4 is a detail in perspective of the fixed bearing-ring formed at the front ends of the plow-beams. Fig. 5 is a detail in perspective of the skeleton wheel-disk member of the attachment.

Referring to the accompanying drawings, 1 designates a gang-plow of an ordinary construction that is supported for travel over the ground on the front and rear ground-wheels 2 and 3, respectively, which wheels are mounted on the usual crank-axles 4, that properly support the divergent beams 5 of the plow. The divergent beams 5 of the plow carry the usual equipments and at their front ends join with a fixed bearing-ring 6, that is preferably formed integral therewith. The fixed bearing-ring 6, that is integrally formed at the front ends of the plow-beams 5, is entirely open at its lower side and is spanned across the top by the transverse cross-plate 7, that is provided at the center with the perforated collar 8, projecting inwardly within the bearing-ring.

The center collar 8 of the cross-plate 7 accommodates therein the upper end of the vertical pivot-bolt 9, the lower end of which is passed through the central pivot-collar 10 of the skeleton turning wheel-disk 11. The pivot-collar 10 of the disk 11 is projected centrally from the upper side of said disk and is held against the center collar 8 of the fixed bearing-ring in order to hold the disk 11 steady in its bearing and prevent the same from working loose or wabbling. The peripheral edges of the wheel-disk 11 ride under and against the lower edge of the fixed bearing-ring 6, and near its periphery the said wheel-disk is provided with an upwardly-projecting circular bearing-flange 12, that freely works inside of the ring 6, that provides a bearing therefor and steadies the same as it turns therein.

The turning wheel-disk 11 has projected from its under side at diametrically-opposite points the aligned integral bearing-boxes 13, in which is journaled the transverse portion of the front crank-axle 4, that carries the forward or front wheel 2 of the plow, so that such front wheel will be turned when the wheel-disk 11 is turned. The said wheel-disk has also projected therefrom a parallel series of offstanding draft-arms 14, that extend beyond the fixed bearing-ring 6 and carry upon their outer ends the clevis-plate 15, provided with a longitudinal series of perforations 16 to provide for the proper attachment of the draft-animals to the clevis-plate in a manner that is well understood.

At a point diametrically opposite the center one of the draft-arms 14 of the wheel-disk the said disk, or at least the flange thereof, is provided with a lock notch or opening 17, adapted to normally receive one end of the sliding latch-bolt 18. The sliding latch-bolt 18 is mounted to slide in the aligned guide-openings 19, formed in one side of the ring 6, and the adjacent transverse guide-bar 20, connecting the beams 5, adjacent to the ring. A spring 21 is coiled on the bolt 18 at one side of the bar 20 to provide for normally projecting the same into engagement with the notch or opening 17 in the wheel-disk, and said bolt is provided with an outer perforated end 22, to which is loosely connected one end of an operating-rod 23, the other end of which is pivotally connected to one end of a foot-lever 24, mounted on a rock-shaft 25, journaled in suitable bearings 26 under the beams 5 of the plow.

When the plow or cultivator is traveling along a furrow, the latch-bolt locks the turning wheel-disk within the bearing-ring 6, and therefore secures the horizontal portion of the front axle of the plow at direct right angles to the line of draft, so that there will be no swerving to either side. At the end of the furrow the driver presses on the lever 24 to withdraw the latch-bolt out of engagement with the notch or opening 17, so that as the draft-animals turn the corner the front wheel will be swung or turned around to follow the draft of the animals, whereby scraping or dragging of said front wheel is obviated and the plow or cultivator prevented from tipping over.

From the foregoing it is thought that the construction, operation, and many advantages of the herein-described fifth-wheel attachment will be readily understood by those skilled in the art, and changes in the form, proportion, and the minor details of construction may be resorted to without departing from the principle or sacrificing any of the advantages of this invention.

Having thus described the invention, what is claimed, and desired to be secured by Letters Patent, is—

1. In an attachment of the class described, a fixed bearing-ring located at the front ends of plow or cultivator beams, a turning wheel-disk pivotally mounted within said bearing-ring and provided with an offstanding draft arm and with diametrically opposite depending bearing-boxes to loosely receive therein a wheel-axle, and a suitably operated latch arranged to secure the wheel-disk stationary in one position, substantially as specified.

2. In an attachment of the class described, the combination of the beams provided at their front ends with a fixed bearing ring having a transverse cross-plate spanning the top side thereof, a turning flanged wheel disk mounted within said bearing ring and provided with an offstanding draft arm, and aligned bearing boxes to receive therein a wheel axle, a pivot bolt engaging said wheel disk and the transverse cross-plate of the bearing ring, and a latch device for locking said wheel disk in one position, substantially as set forth.

3. In an attachment of the class described, the beams provided at their front ends with a fixed bearing ring having a transverse cross plate at the top, a turning wheel disk arranged at the lower side of the bearing ring and provided with an upwardly projecting circular bearing flange working within said ring, a central pivot collar, a series of offstanding draft arms carrying a clevis plate, diametrically opposite depending bearing boxes to loosely receive therein a wheel axle, and a lock notch or opening formed in said bearing flange diametrically opposite the center one of said draft arms, and a lever-controlled spring-actuated latch bolt mounted to slide through an opening in one side of said bearing ring and adapted to normally engage the lock notch or opening of said wheel disk, substantially as set forth.

In testimony that I claim the foregoing as my own I have hereto affixed my signature in the presence of two witnesses.

AMBROSE F. JACKSON.

Witnesses:
JAS. L. WIESEN,
H. WILL.